Aug. 10, 1954     J. WECHSLER     2,686,298
ELECTRODE RECEPTACLE FOR ELONGATED DOUBLE ENDED LAMPS
Filed April 28, 1953
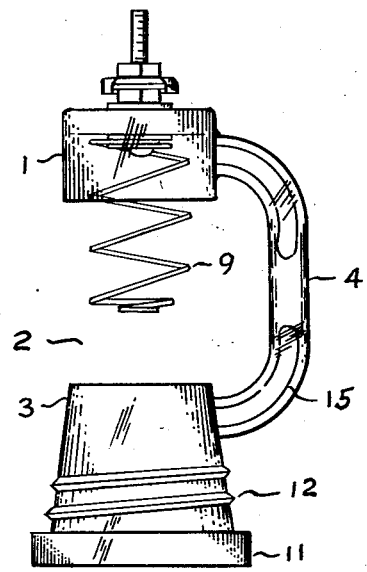
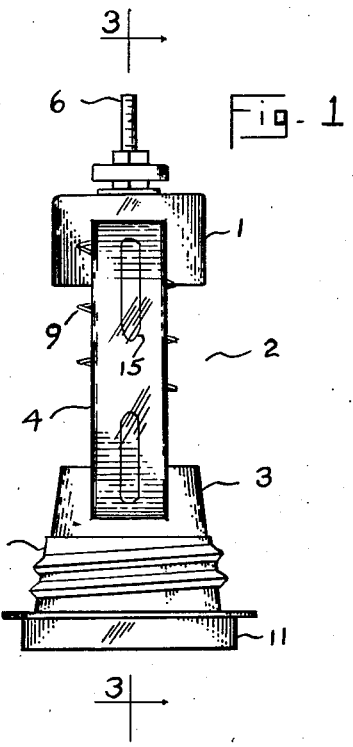
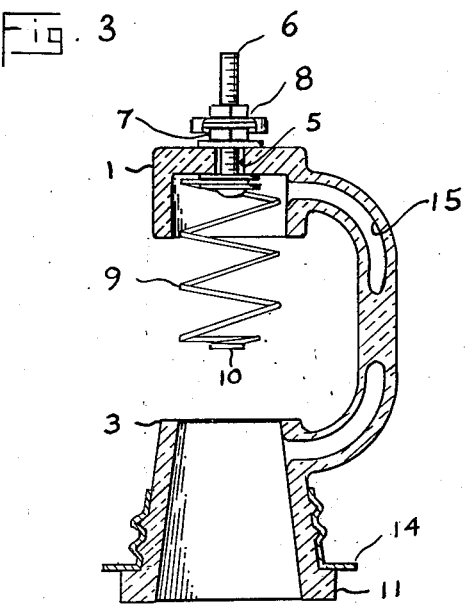
INVENTOR.
JOSEPH WECHSLER
BY Nicholas J. Garofalo
ATTORNEY Patented Aug. 10, 1954

2,686,298

UNITED STATES PATENT OFFICE 2,686,298

ELECTRODE RECEPTACLE FOR ELONGATED DOUBLE ENDED LAMPS

Joseph Wechsler, Long Beach, N. Y.

Application April 28, 1953, Serial No. 351,540

2 Claims. (Cl. 339—50)

This invention relates in general to electrode housing glasses such as are used in neon lamp signs and the like, and it is particularly concerned with an improved type of electrode housing glass having many advantages.

A general object of the invention is to eliminate the major difficulties commonly associated with the conventional type housing glass.

The conventional electrode housing glass is substantially of a hollow frustro conical design, having a supply terminal on the outside of one end of the glass connected with a coiled spring electrode within the hollow portion of the glass. The hollow housing is open at the opposite end through which it admits the electrode of a neon lamp for electrical contact with the coiled spring electrode. The major difficulty associated with housings of this type is breakage or cracking of the glass housing due to heat. This heat is generally created at the electrodes and is due to a variety of causes, such as shorts, sparking, high voltage passed through the electrodes, defective contacts, long hours of continuous conduction in the neon lamp, and perhaps others. Another major difficulty associated with conventional glass housings concerns the tendency of large quantities of dust, foreign particles, dirt, and particularly bugs to accumulate within the hollow housing. The accumulation of such matter is blown or finds entrance into the housing at the sides of the neon lamp, and at times it may create fouled or slight spreading of the contacts with attendant sparking and burning of the electrodes, possible shorts and interference with the electrical circuit, and the development of heat at the electrodes sufficient to cause cracking or breakage of the housing.

Now, I have invented an electrode housing glass, an object of which is the elimination of these various difficulties. I accomplish this by a novel and unique construction of the housing glass in which the central portion of the housing about the electrodes is open all around. This enlarged opening exposes the electrodes to the changing surrounding air, whereby heat, generated by long periods of operation or otherwise, is carried off by the surrounding air and cannot accumulate to crack or damage the glass housing or the electrodes. This enlarged opening prevents bugs, moths, flies, dust and foreign particles from accumulating within the housing and interfering with the electrodes. This opening further serves as an outlet for moisture, and thereby prevents its accumulation within the housing and its customary harmful effects upon the electrodes.

A further feature of the invention is the peculiar and distinctive nature of its general structure and the arrangement of its various component elements and their relation to one another.

Another object of the invention is the provision of an electrode housing glass for neon lamps and the like provided with means whereby the accumulation of foreign matter within the housing is avoided and adequate drainage is provided against the accumulation of moisture within the housing about the electrodes.

Another object of the invention is an electrode housing glass having a substantial opening about its central portion.

A further object of the invention is the provision of an electrode housing glass that is not subject to the conventional difficulties of cracking due to the accumulation of heat within the housing, nor to the accumulation of foreign matter and moisture about the electrodes.

The foregoing objects and advantages of this invention, as well as others, will become readily apparent as this specification unfolds in greater detail and as it is read in conjunction with the accompanying drawings, wherein, Fig. 1 is an elevational view of an electrode housing glass embodying the invention;

Fig. 2 is a further elevational view of the housing; and,

Fig. 3 is a section through the housing taken on the line 3—3 of Fig. 1.

In the drawings there is disclosed a frustro conical housing having an upper terminal section 1 completely separated by a substantial space 2 from a lower base section 3. The two sections are bridged together by a connecting piece 4. The upper and lower sections of the housing and the connecting piece are preferably of glass. The upper section 1 is hollow and opens through at its lower end into the intermediate space 2. It is closed at its top and except for a central bore 5 through which extends a conventional terminal bolt 6. The latter carries on its outer end a securing nut 7 and terminal nut and washers 8. It carries at its other end a coiled spring or housing electrode 9 of conventional nature. The coiled spring extends through the hollow portion of the upper housing section and its contact end 10 extends substantially into the space 2 separating the upper and lower sections.

The lower portion 3 of the housing is hollow through and open at both ends. It serves to admit through the base end of the opening the electrode of a neon lamp for contact with the coiled spring electrode. When admitted, the neon lamp electrode contact end will make contact with the contact end of the coiled spring electrode substantially at the middle of the separating space 2.

The housing is further provided with a circumferential lip 11 at its base and peripheral threads 12 above the lip and about the section 3. The threads are adapted to accommodate the threads of a conventional collar 14. By means of the lip 11 and the collar 14 the housing may be secured in conventional manner in the frame of a sign or other supporting structure.

The bridge element 4 is preferably arcuate or arched from one section of the housing the other. The arched nature of the bridge not only allows for greater strength, but among other things enables the space separating the upper and lower housing sections to be fully open and unobstructed. The strength and durability of the bridge element is further provided for by the provision therein of extended bores 15, one at each end. Each bore opens out into the hollow portion of the section of the housing with which its end of the bridge element is connected. The bores 15 serve to prevent cracking of the bridge element by allowing for possible expansion or contraction of the glass with changing temperatures and weather conditions.

The conventional collar 14 is fitted on to the threads 12 of the housing by first slipping it over the upper section 1, and then passing it over the bridge and down onto the threads of the lower section 3.

It needs no explanation to see how the electrodes meeting in the space 2 between the housing sections are protected from accumulations of dirt, bugs and moisture, as there is no surrounding portion of the housing to support such matter. It is intended that the space separating the housing sections be of a size sufficient to obtain the purposes intended. It is desirably of a substantial nature. Here it is about one-third of the overall height of the housing glass.

While the invention has been described and illustrated as above, it is understood that other forms and modifications thereof might suggest themselves, and it is my intent, therefore, to claim the invention not only as shown and described but also in all such forms and variations thereof, as may in the spirit of the invention be reasonably construed to be within the scope of the Letters Patent.

I claim:

1. An electrode housing of the character described, comprising a unitary glass member having a short cylindrical upper section opening out through its lower end, a lower opposed elongated annulus section adapted to be secured in the body of a sign and having the opening therethrough axially aligned with that of the upper section, the lower section being spaced from the upper section a distance equal to approximately one third of the overall length of the unitary glass member, and an arcuate rib member of narrow dimensions spanning the space separating the two sections and connecting the one section to the other, the peak portion of the arcuate rib being furthest away from the two sections and directly opposite the space between them, an electrode coil spring secured in the opening of the upper section and axially extending out of it into the intervening space below to about the mid-point thereof, and the lower section adapted to receive therethrough the electrode end of a neon tube lamp for contact with the free end of the coil spring electrode.

2. In an electrode housing of the character set forth in claim 1, wherein the arcuate rib element is characterized as including an extended bore interiorly of each end, the bore at one end communicating through the side of the short cylindrical section to the opening thereof, and the other bore of the arcuate rib communicating through the side of the elongated annulus section to the opening thereof, the extended bores serving to allow for expansion of the arcuate rib to avoid cracking thereof upon the latter absorbing heat from the nearby neon lamp.

References Cited in the file of this patent

UNITED STATES PATENTS

| Number | Name | Date |
|---|---|---|
| 1,820,202 | Smalley | Aug. 25, 1931 |
| 2,147,847 | Kresge | Feb. 21, 1939 |
| 2,152,558 | Montroy | Mar. 28, 1939 |
| 2,235,640 | Kresge | Mar. 18, 1941 |
| 2,268,470 | Bass et al. | Dec. 30, 1941 |